US012531169B1

(12) United States Patent
Lambert

(10) Patent No.: US 12,531,169 B1
(45) Date of Patent: Jan. 20, 2026

(54) ELECTROCATALYTIC DEVICES USING MOX/ICP COMPOSITE THIN FILMS AND METHODS OF MAKING THE SAME

(71) Applicant: National Technology & Engineering Solutions of Sandia, LLC, Albuquerque, NM (US)

(72) Inventor: Timothy N. Lambert, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 249 days.

(21) Appl. No.: 18/203,384

(22) Filed: May 30, 2023

Related U.S. Application Data

(63) Continuation of application No. 15/678,914, filed on Aug. 16, 2017, now abandoned.

(60) Provisional application No. 62/377,282, filed on Aug. 19, 2016.

(51) Int. Cl.
| | | |
|---|---|---|
| *H01B 1/00* | (2006.01) |
| *C01G 45/02* | (2006.01) |
| *C08F 134/04* | (2006.01) |
| *H01B 1/02* | (2006.01) |
| *H01B 1/12* | (2006.01) |
| *H01M 4/04* | (2006.01) |
| *H01M 4/50* | (2010.01) |
| *H01M 4/60* | (2006.01) |
| *H01M 4/66* | (2006.01) |
| *H01M 50/122* | (2021.01) |
| *C25B 11/095* | (2021.01) |

(52) U.S. Cl.
CPC .............. *H01B 1/124* (2013.01); *C01G 45/02* (2013.01); *C08F 134/04* (2013.01); *H01B 1/02* (2013.01); *H01M 4/04* (2013.01); *H01M 4/50* (2013.01); *H01M 4/608* (2013.01); *H01M 4/668* (2013.01); *H01M 50/122* (2021.01); *C25B 11/095* (2021.01)

(58) Field of Classification Search
CPC ............ H01B 1/00; H01B 1/08; H01B 1/124; H01M 4/36; H01M 4/48; H01M 4/608; C25B 11/051; C25B 11/077
See application file for complete search history.

(56) References Cited

U.S. PATENT DOCUMENTS 10,978,734 B2 * 4/2021 Mukherjee ............. H01G 11/86
2009/0272949 A1 11/2009 Buttry

FOREIGN PATENT DOCUMENTS

CN 102800487 A 11/2012

OTHER PUBLICATIONS

Kuo et al "Study of Poly (3,4-ethylenedioxythiophene)/MnO2 as Composite Cathode Materials for Aluminum-Air Battery", Electrochimica Acta 176 (2015) 1324-1331.*

(Continued)

*Primary Examiner* — Mark Kopec
(74) *Attorney, Agent, or Firm* — Daniel J. Jenkins

(57) ABSTRACT

The present disclosure is directed to electrocatalytic devices having an electrodeposited $MO_x$/ICP composite thin films for performing oxygen reduction reactions.

7 Claims, 6 Drawing Sheets

(56) References Cited

OTHER PUBLICATIONS

Choe et al "Manganese Dioxide/Reduced Graphene Oxide with Poly(3,4-ethylenedioxythiophene) for Improved Electrocatalytic Oxygen Reduction Reaction", Journal of Nanoscience and Nanotechnology vol. 15, 5684-5690, 2015.*

Hou et al "Design and Synthesis of Hierarchical MnO2 Nanospheres/Carbon Nanotubes/Conducting Polymer Ternary Composite for High Performance Electrochemical Electrodes", Nano Lett. 2010, 10, 2727-2733.*

Antolini, E. et al., "Polymer supports for low-temperature fuel cell catalysts," Applied Catalysis A: General (2009) 365:1-19.

Babakhani, B. et al., "Improved capacitive behavior of electrochemically synthesized Mn oxide/PEDOT electrodes utilized as electrochemical capacitors," Electrochimica Acta (2010) 55:4014-4024.

Benbow, E. M. et al., "Oxygen Reduction Properties of Bifunctional α-Manganese Oxide Electrocatalysts in Aqueous and Organic Electrolytes," The Journal of Physical Chemistry C (2011) 115:22009-22017.

Birss, V. I. et al., "An electrochemical study of the composition of thin, compact Pd oxide films," J. Chem. Soc., Faraday Trans. (1996) 92(20:4041-4047.

Bolzán, A. E. et al., "The electrochemical behaviour of hydrous palladium oxide layers formed at high positive potentials in different electrolyte solutions," J. Electroanal. Chem. (1992) 322:247-265.

Borup, R. et al., "Scientific Aspects of Polymer Electrolyte Fuel Cell Durability and Degradation," Chem. Rev. (2007) 107:3904-3951.

Bund, A. et al., "Effect of the Solvent and the Anion on the Doping/Dedoping Behavior of Poly(3,4-ethylenedioxythiophene) Films Studied with the Electrochemical Quartz Microbalance," J. Phys. Chem. B (2004) 108:17845-17850.

Chen, L. et al., "Synthesis and pseudocapacitive studies of composite films of polyaniline and manganese oxide nanoparticles," Journal of Power Sources (2010) 195:3742-3747.

Choe, J. E. et al., "3,4-Ethylenedioxythiophene functionalized graphene with palladium nanoparticles for enhanced electrocatalytic oxygen reduction reaction," Journal of Power Sources (2015) 281:211-218.

Chowdhury, A. D. et al., "Conducting $CoMn_2O_4$—PEDOT nanocomposites as catalyst in oxygen reduction reaction," Electrochimica Acta (2014) 118:81-87.

Cottis, P. P. et al., "Metal-free oxygen reduction electrodes based on thin PEDOT films with high electrocatalytic activity," RSC Advances (2014) 4:9819-9824.

Das, D. et al., "Mechanism of potentiostatic deposition of $MnO_2$ and electrochemical characteristics of the deposit in relation to carbohydrate oxidation," Electrochimica Acta (2008) 54:289-295.

Davis, D. J. et al., "Silver-Graphene Nanoribbon Composite Catalyst for the Oxygen Reduction Reaction in Alkaline Electrolyte," Electroanalysis (2014) 26:164-170.

Davis. D. J. et al., "Role of Cu-Ion Doping in Cu-α-$MnO_2$ Nanowire Electrocatalysts for the Oxygen Reduction Reaction," The Journal of Physical Chemistry C (2014) 118:17342-17350.

Diabaté, D. et al., "Kinetic Study of Oxygen Reduction Reaction on Carbon Supported Pd-Based Nanomaterials in Alkaline Medium," Journal of the Electrochemical Society (2013) 160(6):H302-H308.

Eliseeva, S. N. et al., "Electrochemical Properties of Composite Films Based on Poly-3,4-Ethylenedioxythiophene with Inclusions of Metallic Palladium," Russian Journal of Electrochemistry (2009) 45(9):1045-1051.

Eliseeva, S. N. et al., "Synthesis and Structure of Poly-3,4-ethylenedioxythiophene Film with the Inclusions of Palladium Nanoparticles," Russian Journal of General Chemistry (2010) 80(6):1143-1148.

Elschner, A. et al., PEDOT Principles and Applications of an Intrinsically Conductive Polymer, CRC Press, Boca Raton, FL (2010) 380 pages.

Fawcett, W. R. et al., "Solvent-Induced Frequency Shifts in the Infrared Spectrum of Dimethyl Sulfoxide in Organic Solvents," J. Phys. Chem. (1996) 100:2019-2024.

Gemeay, A. H. et al., "Chemical Preparation of Manganese Dioxide/Polypyrrole Composites and Their Use as Cathode Active Materials for Rechargeable Lithium Batteries," J. Electrochem. Soc. (1995) 142(12):4190-4195.

Gnana Kumar, G. et al., "Graphene/poly(3,4-ethylenedioxythiophene)/$Fe_3O_4$ nanocomposite—An efficient oxygen reduction catalyst for the continuous electricity production from wastewater treatment microbial fuel cells," International Journal of Hydrogen Energy (2016) 41:13208-13219.

Gong, Y. et al., "Boron- and Nitrogen-Substituted Graphene Nanoribbons as Efficient Catalysts for Oxygen Reduction Reaction," Chemistry of Materials (2015) 27:1181-1186.

Gorlin, Y. et al., "A Bifunctional Nonprecious Metal Catalyst for Oxygen Reduction and Water Oxidation," J. Am. Chem. Soc. (2010) 132:13612-13614.

Grdeń, M. et al., "Electrochemical behaviour of palladium electrode: Oxidation, electrodissolution and ionic adsorption," Electrochimica Acta (2008) 53:7583-7598.

Gröger, O. et al., "Review—Electromobility: Batteries or Fuel Cells?" Journal of the Electrochemical Society (2015) 162(14):A2605-A2622.

Guo, Z. et al., "Self-assembled hierarchical micro/nano-structured PEDOT as an efficient oxygen reduction catalyst over a wide pH range," Journal of Materials Chemistry (2012) 22:17153-17158.

Guo, Z. et al., "Sulfur, Trace Nitrogen and Iron Codoped Hierarchically Porous Carbon Foams as Synergistic Catalysts for Oxygen Reduction Reaction," ACS Applied Materials & Interfaces (2014) 6:21454-21460.

Guo, Z. et al., "Biomolecule-Doped EPDOT with Three-Dimensional Nanostructures as Efficient Catalyst for Oxygen Reduction Reaction," Small (2014) 10(10):2087-2095.

Hasan, M. A. et al., "Promotion of the hydrogen peroxide decomposition activity of manganese oxide catalysts," Applied Catalysis A: General (1999) 181:171-179.

He, Q. et al., "Review—Recent Progress in Electrocatalysts for Oxygen Reduction Suitable for Alkaline Anion Exchange Membrane Fuel Cells," Journal of the Electrochemical Society (2015) 162(14):F1504-F1539.

Hoare, J. P., "The Effect of Metal Dissolution on the Rest Potential in the Palladium-Oxygen-Acid System," Journal of the Electrochemical Society (1964) 111(5):610-615.

Hou, Y. et al., "Design and Synthesis of Hierarchical $MnO_2$ Nanospheres/Carbon Nanotubes/Conducting Polymer Ternary Composite for High Performance Electrochemical Electrodes," Nano Letters (2010) 10:2727-2733.

Jiang, L., et al., "Size-Dependent Activity of Palladium Nanoparticles for Oxygen Electroreduction in Alkaline Solutions," Journal of the Electrochemical Society (2009) 156(5):B643-B649.

Jiang, Z. et al., "Shewanella-mediated Biosynthesis of Manganese Oxide Micro-/Nanocubes as Efficient Electrocatalysts for the Oxygen Reduction Reaction," ChemSusChem (2015) 8:158-163.

Jin. C. et al., "Facile synthesis and excellent electrochemical properties of $NiCo_2O_4$ spinel nanowire arrays as a bifunctional catalyst for the oxygen reduction and evolution reaction," Journal of Materials Chemistry A (2013) 1:12170-12177.

Kerr, R. et al., "Influence of the Polymerization Method on the Oxygen Reduction Reaction Pathway on PEDOT," ECS Electrochemistry Letters (2013) 2(3):F29-F31.

Kerr, R. et al., "The Reduction of Oxygen on Iron(II) Oxide/Poly(3,4-ethylenedioxythiophene) Composite Thin Film Electrodes," Electrochimica Acta (2015) 154:142-148.

Khomenko, V. G. et al., "The catalytic activity of conducting polymers toward oxygen reduction," Electrochimica Acta (2005) 50:1675-1683.

Kim, K. S. et al., "X-Ray Photoelectron Spectroscopic Studies of Palladium Oxides and the Palladium-Oxygen Electrode," Analytical Chemistry (1974) 46(2):197-200.

Kim, H. et al., "Synthesis and Characterization of $MnO_2$-Based Mixed Oxides as Supercapacitors," Journal of the Electrochemical Society (2003) 150(3):D56-D62.

(56) References Cited

OTHER PUBLICATIONS

Kondratiev, V. V. et al., "Structure and Electrochemical Properties of Composite Files Based on Poly-3,4-Ethylenedioxythiophene with Metallic Palladium Inclusions," Russian Journal of Electrochemistry (2012) 48(2):205-211.

Kuo, Y.-L. et al., "Study of Poly (3,40ethylenedioxythiophene)/$MnO_2$ as Composite Cathode Materials for Aluminum-Air Battery," Electrochimica Acta (2015) 176:1324-1331.

Kuwabata, S. et al., "Electrochemical Synthesis of Composite Films of Manganese Dioxide and Polypyrrole and Their Properties as an Active Material in Lithium Secondary Batteries," J. Electrochem. Soc. (1994) 141(1):10-15.

Lambert, T. N. et al., "Graphene-Ni-$\alpha$-$MnO_2$ and -Cu-$\alpha$-$MnO_2$ nanowire blends as highly active non-precious metal catalysts for the oxygen reduction reaction," Chem. Commun. (2012) 48:7931-7933.

Lambert, T. N. et al., "Electrodeposited $Ni_xCo_{3-x}O_4$ nanostructured films as bifunctional oxygen electrocatalysts," Chem. Commun. (2015) 51:9511-9514.

Lambert, T. N. et al., "Manganese Oxide/Poly(3,4-ethylenedioxythiophene) Hybrid Electrocatalysts for the Oxygen Reduction Reaction in Alkaline Fuel Cells," ECS Transactions (2016) 75(14):965-970.

Lambert, T. N. et al., "Understanding the Effects of Cationic Dopants on a-$MnO_2$ Oxygen Reduction Reaction Electrocatalysis," The Journal of Physical Chemistry C (2017) 121:2789-2797.

Larminie, J. et al., Fuel Cell Systems Explained, John Wiley & Sons Ltd., West Sussex, England (2013) pp. 25-43.

Lee, J.-S. et al., "Ionic liquid modified graphene nanosheets anchoring manganese oxide nanoparticles as efficient electrocatalysts for Zn-air batteries," Energy & Environmental Science (2011) 4:4148-4154.

Lefebvre, M. C. et al., "Electronically Conducting Proton Exchange Polymers as Catalyst Supports for Proton Exchange Membrane Fuel Cells," Journal of the Electrochemical Society (1999) 146(6):2054-2058.

Lima, F. H. B., et al., "Catalytic Activity-d-Band Center Correlation for the $O_2$ Reduction Reaction on Platinum in Alkaline Solutions," J. Phys. Chem. C (2007) 111:404-410.

Liu, R. et al., "$MnO_2$/Ploy(3,4-ethylenedioxythiophene) Coaxial Nanowires by One-Step Coelectrodeposition for Electrochemical Energy Storage," J. Am. Chem. Soc. (2008) 130:2942-2943.

Liu, R. et al., "Redox Exchange Induced $MnO_2$ Nanoparticle Enrichment in Poly(3,4-ethylenedioxythiophene) Nanowires for Electrochemical Energy Storage," ACS Nano (2010) 4(7):4299-4307.

Liu, Z. et al., "One-step scalable preparation of N-doped nanoporous carbon as a high-performance electrocatalyst for the oxygen reduction reaction," Nano Research (2013) 6(4):293-301.

Lüsi, M. et al., "Oxygen reduction reaction on carbon-supported palladium nanocubes in alkaline media," Electrochemistry Communications (2016) 64:9-13.

Ma, S.-B. et al., "Spontaneously Deposited Manganese Oxide on Acetylene Black in an Aqueous Potassium Permanganate Solution," Journal of the Electrochemical Society (2006) 153(1):C27-C32.

Ma, S.-B. et al., "Synthesis and characterization of manganese dioxide spontaneously coated on carbon nanotubes," Carbon (2007) 45:375-382.

Ma, J. et al., "Improved Oxygen Reduction Activity on PEDOT Via Electroolymerisation in Ionic Liquid," Int. J. Electrochem. Sci. (2015) 10:4562-4570.

Mao, L. et al., "Mechanistic study of the reduction of oxygen in air electrode with manganese oxides as electrocatalysts," Electrochimica Acta (2003) 48:1015-1021.

Marinho, B. et al., "Electrical conductivity of compacts of graphene, multi-wall carbon nanotubes, carbon black, and graphite powder," Powder Technology (2012) 221:351-358.

Meng, Y. et al., "Structure-Property Relationship of Bifunctional MnO2 Nanostructures: Highly Efficient, Ultra-Stable Electrochemical Water Oxidation and Oxygen Reduction Reaction Catalysts Identified in Alkaline Media," J. Am. Chem. Soc. (2014) 136:11452-11464.

Mitraka, E. et al., "Oxygen-induced doping on reduced PEDOT," Journal of Materials Chemistry A (2017) 5:4404-4412.

Nelson, A. J. et al., "Core-level satellites and outer core-level multiplet splitting in Mn model compounds," J. Vac. Sci. Technol. A. (2000) 18(4):1072-1076.

Nørskov, J. K. et al., "Origin of the Overpotential for Oxygen Reduction at a Fuel-Cell Cathode," J. Phys. Chem. B (2004) 108:17886-17892.

Park, H. W. et al., "Electrospun porous nanorod perovskite oxide/nitrogen-doped graphene composite as a bi-functional catalyst for metal air batteries," Nano Energy (2014) 10:192-200.

Ramaswamy, N. et al., "Fundamental Mechanistic Understanding of Electrocatalysis of Oxygen Reduction on Pt and Non-Pt Surfaces: Acid versus Alkaline Media," Advances in Physical Chemistry (2012) 491604, 17 pages.

Ramaswamy, N. et al., "Activity Descriptor Identification for Oxygen Reduction on Nonprecious Electrocatalysts: Linking Surface Science to Coordination Chemistry," J. Am. Chem. Soc. (2013) 135:15443-15449.

Ryabova, A. S. et al., "Study of Hydrogen Peroxide Reactions on Manganese Oxides as a Tool to Decode the Oxygen Reduction Reaction Mechanism," ChemElectroChem (2016) 3:1667-1677.

Ryabova, A. S. et al., "Rationalizing the Influence of the Mn(IV)/Mn(III) Red-Ox Transition on the Electrocatalytic Activity of Manganese Oxides in the Oxygen Reduction Reaction," Electrochimica Acta, (2016) 187:161-172.

Sakmeche, N. et al., "Anionic micelles; a new aqueous medium for electropolymerization of poly(3,4-ethylenedioxythiophene) films on Pt electrodes," Chem. Commun. (1996) 24:2723-2724.

Sakmeche, N. et al., "Improvement of the Electrosynthesis and Physiochemical Properties of Poly(3,4-ethylenedioxythiophene) Using a Sodium Dodecyl Sulfate Micellar Aqueous Medium," Langmuir (1999) 15:2566-2574.

Sen, P. et al., "Conducting polymer based manganese dioxide nanocomposite as supercapacitor," Electrochimica Acta (2013) 108:265-273.

Stamenkovic, V. R. et al., "Energy and fuels from electrochemical interfaces," Nature Materials (2017) 16:57-69.

Stanis, R. J. eta l., "Poly(3,4-ethylenedioxythiophene) (PEDOT)-Modified Anodes: Reduced Methanol Crossover in Direct Methanol Fuel Cells," Energy Fuels (2010) 24:3125-3129.

Su, H.-Y. et al., "Identifying active surface phases for metal oxide electrocatalysts: a study of manganese oxide bi-functional catalysts for oxygen reduction and water oxidation catalysis," Phys. Chem. Chem. Phys. (2012) 14:14010-14022.

Suntivich, J. et al., "Design principles for oxygen-reduction activity on perovskite oxide catalysts for fuel cells and metal-air batteries," Nature Chemistry (2011) 3:546-550.

Tang, P. et al., "Step-by-step assembled poly(3,4-ethylenedioxythiophene)/manganese dioxide composite electrodes: Tuning the structure for high electrochemical performance," Electrochimica Acta (2013) 89:300-309.

Tench, D. et al., "Electrodeposition of Conducting Transition Metal Oxide/Hydroxide Films from Aqueous Solution," J. Electrochem. Soc. (1983) 130(4):869-872.

Tintula, K. K. et al., "Directed Synthesis of MC-PEDOT Composite Catalyst-Supports for Durable PEFCs," Journal of the Electrochemical Society (2011) 158(6):B622-B631.

Vigil, J. A. et al., "Electrodeposited $MnO_x$/PEDOT Composite Thin Films for the Oxygen Reduction Reaction," ACS Applied Materials & Interfaces (2015) 7:22745-22750.

Vigil, J. A. et al., "Hybrid PEDOT/$MnO_x$ nanostructured electrocatalysts for oxygen reduction," Mater. Chem. Front (2017) 1:1668-1675.

Vigil, J. A. et al., "Nanoscale Carbon Modified a-MnO2 Nanowires: Highly Active and Stable Oxygen Reduction Electrocatalysts with Low Carbon Content," ACS Applied Materials & Interfaces (2018) 10:2040-2050.

Vracar, LJ. M. et al., "Palladium Electrode in Oxygen-Saturated Aqueous Solutions," J. Electrochem. Soc. (1986) 133(9):1835-1839.

(56) References Cited

OTHER PUBLICATIONS

Vracar, LJ. M. et al., "Palladium Electrode in Oxygen-Saturated Aqueous Solutions," J. Electrochem. Soc. (1989) 136(7):1973-1977.

Wang, S. et al., "BCN Graphene as Efficient Metal-Free Electrocatalyst for the Oxygen Reduction Reaction," Angew. Chem. Int. Ed. (2012) 51:4209-4212.

Winther-Jensen, B. et al., "High Rates of Oxygen Reduction over a Vapor Phase-Polymerized PEDOT Electrode," Science (2008) 321:671-674.

Wu, Z.-Y. et al., "Electrochemical Preparation and Characterization of $MnO_2$-PEDOT Hybrid Film and its Application in Electrocatalytic Oxidation of Memantine Hydrochloride," Int. J. Electrochem. Sci. (2012) 7:1230-1241.

Wu, Q. et al., "Carbon supported PdO with improved activity and stability for oxygen reduction reaction in alkaline solution," Electrochimica Acta (2014) 150:157-166.

Yan, W. et al., "Ultrasmall Palladium Nanoclusters Encapsulated in Porous Carbon Nanosheets for Oxygen Electroreduction in Alkaline Media," ChemElectroChem (2017) 4:1349-1355.

Yang, J. et al., "Nanoporous amorphous manganese oxide as electrocatalyst for oxygen reduction in alkaline solutions," Electrochemistry Communications (2003) 5:306-311.

Yang. Z. et al., "Sulfur-Doped Graphene as an Efficient Metal-free Cathode Catalyst for Oxygen Reduction," ACS Nano (2012) 6(1):205-211.

Yang, Y. et al., "Manganese dioxide nanoparticle enrichment in porous conducting polymer as high performance supercapacitor electrode materials," Electrochimica Acta (2015) 165:323-329.

Yoneyama, H. et al., "Charge-Discharge Properties of Polypyrrole Films Containing Manganese Dioxide Particles," J. Chem. Soc., Chem. Commun. (1991) pp. 986-987.

Zhang, L. L. et al., "Manganese oxide-carbon composite as supercapacitor electrode materials," Microporous and Mesoporous Materials (2009) 123:260-267.

Zhang, M. et al., "Solution-Processed PEDOT:PSS/Graphene Composites as the Electrocatalyst for Oxygen Reduction Reaction," ACS Applied Materials & Interfaces (2014) 6:3587-3593.

Zhang, L. et al., "Preparation of PEDOT/GO, PEDOT/$MnO_2$, and PEDOT/GO/$MnO_2$ nanocomposites and their application in catalytic degradation of methylene blue," Nanoscale Research Letters (2015) 10:148, 9 pages.

Zhou, R. et al., "Determination of the Electron Transfer Number for the Oxygen Reduction Reaction: From Theory to Experiment," ACS Catalysis (2016) 6:4720-4728.

Zhou, Q. et al., "Conducting Polymer-Based Catalysts," J. Am. Chem. Soc. (2016) 138:2868-2876.

\* cited by examiner

Figure 1.0

ELECTROCATALYTIC DEVICES USING MOX/ICP COMPOSITE THIN FILMS AND METHODS OF MAKING THE SAME

CROSS-REFERENCE TO RELATED APPLICATIONS

This application is a continuation of U.S. patent application Ser. No. 15/678,914, entitled "Electrocatalytic Devices Using MOx/ICP Composite Thin Films and Methods of Making the Same", filed Aug. 16, 2017, which claims the benefit of U.S. Provisional Patent Application No. 62/377,282, entitled "Electrocatalytic Devices Using MOx/ICP Composite Thin Films and Methods of Making the Same", filed Aug. 19, 2016, which is incorporated by reference herein in its entirety.

STATEMENT CONCERNING FEDERALLY-SPONSORED RESEARCH

The United States Government has rights in this invention pursuant to Contract No. DE-AC04-94AL85000 between the United States Department of Energy and Sandia Corporation, and Contract No. DE-NA0003525 between the United State Department of Energy and National Technology & Engineering Solutions of Sandia, LLC, both for the operation of the Sandia National Laboratories.

FIELD

This invention relates generally to catalysis, and more particularly to electrocatalytic devices having cathodes including $MO_x$/ICP composite thin films.

BACKGROUND OF THE INVENTION

As one of the key electrochemical reactions in energy storage and conversion applications, the efficiency of the oxygen reduction reaction (ORR) is crucial to next-generation devices. High overpotentials are associated with the complex, four-electron transfer of the ORR, increasing operating potentials for devices like fuel cells and metal-air batteries. Commercially used electrocatalysts for the ORR, such as Pt and Pt/C, are expensive, rare, and not environmentally sustainable. Thus, there is motivation to design materials with the ability to catalyze the ORR that do not incur such high costs and sacrifice resources.

Metal oxides ($MO_x$) have gained a certain prominence as non-precious metal electrocatalyst for the ORR with their ease and versatility of preparation, high activity, wide stability range, and environmental abundance. This includes, but is not limited to, perovskites, e.g., $La_{0.5}Sr_{0.5}Co_{0.8}Fe_{0.2}O_3$, spinels, e.g., $Ni_xCo_{3-x}O_4$ and manganese-based oxides, e.g., $MnO_2$ and $Mn_2O_3$. Manganese oxides ($MnO_x$) have specific advantages in being extremely abundant and are naturally effective at decomposing peroxide, a possible intermediate/product of the oxygen reduction reaction (ORR). Formally, the ORR can either proceed by a direct, four-electron reduction to hydroxide (Equation 1) or a two-electron reduction to peroxide (Equation 2), followed by either another two-electron reduction of the peroxide (Equation 3) or catalytic decomposition of the peroxide (Equation 4).

$$O_{2(g)} + 2H_2O_{(l)} + 4e^- \rightarrow 4OH^-_{(aq)} \qquad (1)$$

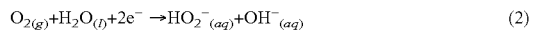

$$O_{2(g)} + H_2O_{(l)} + 2e^- \rightarrow HO_2^-_{(aq)} + OH^-_{(aq)} \qquad (2)$$

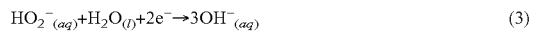

$$HO_2^-_{(aq)} + H_2O_{(l)} + 2e^- \rightarrow 3OH^-_{(aq)} \qquad (3)$$

$$2HO_2^-_{(aq)} \rightarrow 2OH^-_{(aq)} + O_{2(g)} \qquad (4)$$

Blending metal oxides ($MO_x$), including $MnO_x$, with carbon has been shown to greatly increase the preference of the four-electron mechanism due to improved conductivity and electron transport. The discovery and implementation of graphene in the past ten years has greatly expanded the possibilities of composite graphene/metal oxide catalysts because of its conductivity, structural variability (e.g. nanoribbons, fullerenes, sheets), effective dispersion of nanomaterials, and independent ORR activity. A class of materials that has been overlooked when considering the approaches to increasing conductivity is intrinsically conductive polymers (ICPs), despite the fact that conjugated polymers and polyheterocycles have exhibited extremely high conductivity.

Poly(3,4-ethylenedioxythiophene) (PEDOT) was discovered in the 1980s and has since been utilized in many industries due to its ease of synthesis, high conductivity, optical properties, and stability in humidity and high temperatures. PEDOT can be easily prepared by "in situ" chemical or electrochemical oxidation methods from the 3,4-ethylenedioxythiophene (EDOT) monomer, and is highly conductive when prepared by either route ($\sim 10^1$-$10^2$ S cm$^{-1}$). Prior developments introduced the possibility of electropolymerization in aqueous media. Besides lowering the oxidation potential, electropolymerization in aqueous media afforded the possibility of co-electrodeposition with other anodically deposited materials, such as $MnO_x$. The oxidation of $Mn^{2+}$ in solution also occurs at a low potential, making the approach of polymerizing PEDOT and growing a $MnO_x$ film simultaneously very reasonable.

What is needed is an electrocatalyst that overcomes the limitations of the prior art.

BRIEF DESCRIPTION OF THE DRAWINGS

FIG. 1.0 shows a two-step preparation of a hybrid PEDOT/MnO2 nanoparticle film on a glassy carbon substrate to form an RDE working electrode or fused silica tab electrode according to an embodiment of the invention.

Wherever possible, the same reference numbers will be used throughout the drawings to represent the same parts.

SUMMARY OF THE INVENTION

Figure 1A:
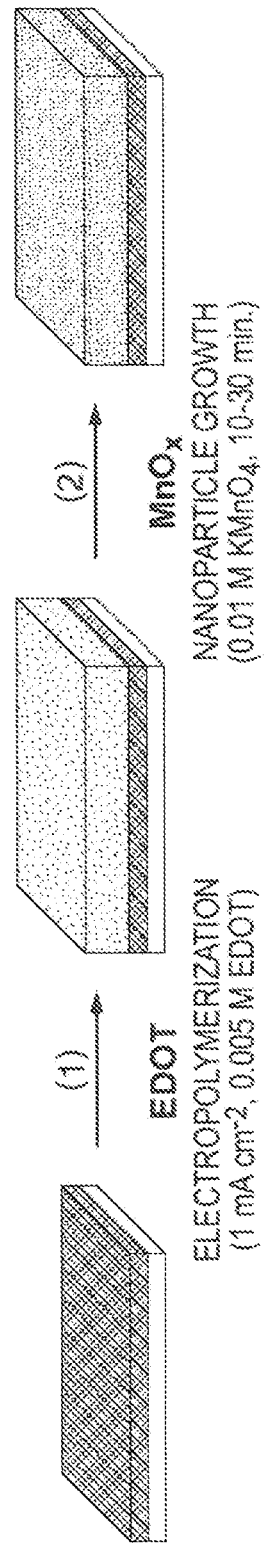
FIG. 1A shows a schematic of the electrodeposition of $MnO_x$/PEDOT composite thin films.
Figure 1A:
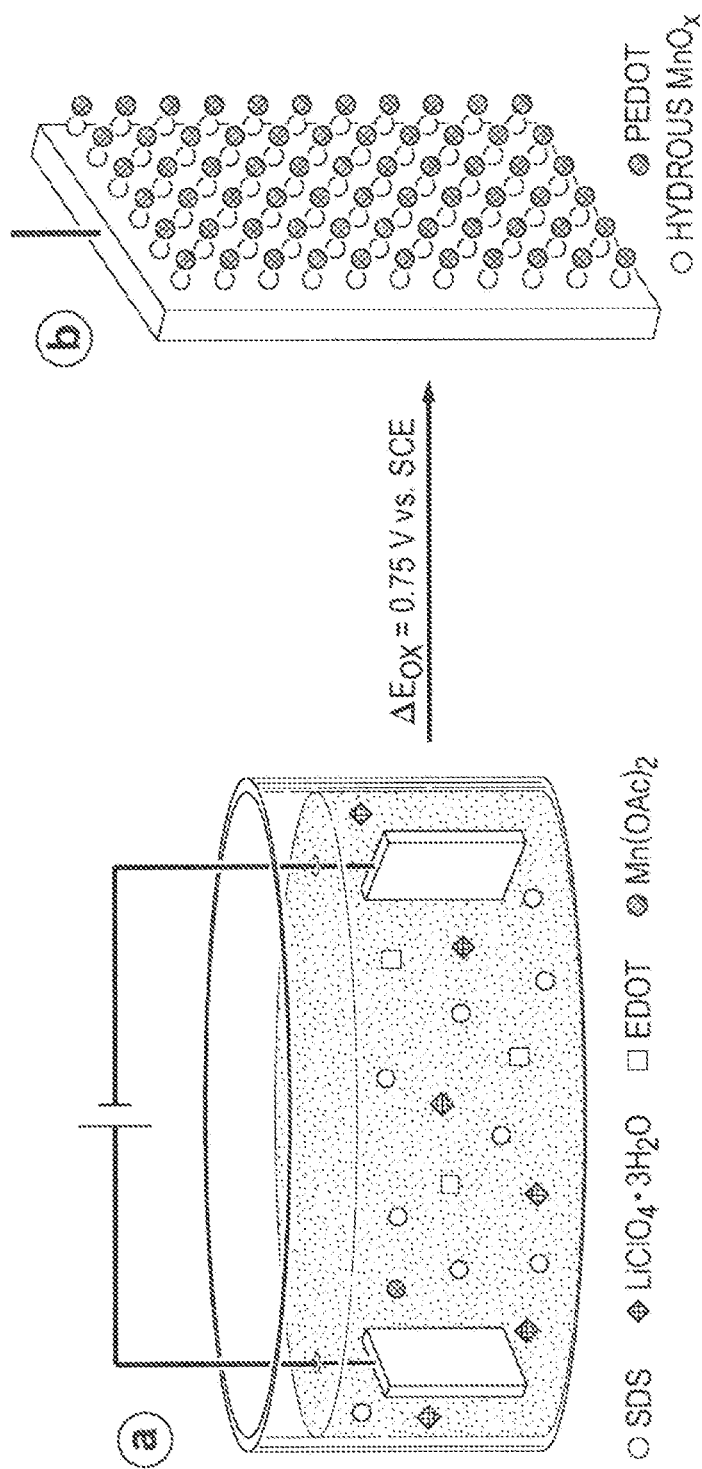

The present disclosure is directed to oxygen reduction reaction (ORR) devices having electrodeposited $MO_x$/Intrinsically conductive polymers (ICP) composite thin films and their method of making. In an embodiment, the metal may be, but is not limited to a manganese oxide and manganese dioxide (collectively referred to as manganese dioxide), ruthenium oxide or other metal oxide capable of facilitating an oxygen reduction reaction. The metal oxide may include a metal additive, such as gold and platinum, for example, in the form of a Au(metal)-$MnO_x$/ICP composite. In an embodiment, the metal oxide may be a mixed metal ORR oxide, with a second metal oxide selected from a group including Fe, Nb and TA, oxides and perovskites. In an embodiment, the manganese oxide may be $Mn_yO_x$ or $MnO_x$, from the group MnO, $MnO_2$, $MnO_3$, $Mn_3O_4$, $Mn_2O_3$, $Mn_2O_7$ and combinations thereof which are exemplified by $MnO_x$ or $MnO_2$ for the remainder of the disclosure. The ICP may be, but is not limited to polythiophenes such as poly (3,4-ethylenedioxythiophene) (PEDOT), propylenedioxythiophene (ProDOT)-phenylene polymers, and polyanilines, and polypyrolles, polyacetylenes, polyphenylenevinylenes and mixtures and unit combinations thereof.

The present disclosure is directed to oxygen reduction reaction (ORR) devices having electrodeposited $MnO_x$/ICP composite thin films and their method of making. In an embodiment, the ORR device may be a cathode. In an embodiment, the composite films may be produced by co-electrodeposition, (electrodeposition, followed by chemical modification) or other (chemical modification followed by a general physical deposition on a substrate). The ORR device may be part of an electrocatalytic device, such as, but not limited to a fuel cell, battery or electrolyzer.

The present disclosure is further directed to methods of forming the composite thin film ORR devices by depositing the ORR thin film electrocatalyst upon a substrate. In an embodiment, the electrocatalyst may be a coating upon or within a cathode substrate, thereby forming an ORR cathode device. In an embodiment, the cathode may be part of, but not limited to a battery, fuel cell, electrolyzer, hydrogen evolution reaction (HER) device, or other device employing an ORR reaction.

In an embodiment, ORR devices having $MnO_x$/ICP composite thin films may be formed by electrodeposition of $MnO_x$/ICP to form a homogeneous film upon a substrate. In another embodiment, the ORR devices having $MnO_x$/ICP composite thin films may be formed by sequentially electrochemically depositing PEDOT and $MnO_2$ to form hybrid films of PEDOT and $MnO_2$ nanoparticles. In an embodiment, the sequential depositing is performed by electropolymerization of EDOT to form PEDOT, followed by aqueous, room-temperature growth of $MnO_2$ nanoparticles by $MnO_4$ reduction. In another embodiment, the ORR devices having $MnO_x$/ICP composite thin films may be formed by sequentially physically depositing PEDOT and $MnO_2$ to form hybrid films of PEDOT and $MnO_2$ nanoparticles where physically depositing includes but is not limited to drop casting or spraying.

In an embodiment, a method of forming a cathode is disclosed that includes co-depositing a $MO_x$/ICP composite thin film upon an electrode substrate.

In another embodiment, a method of forming a cathode is disclosed that includes depositing a $MO_x$/ICP composite thin film upon an electrode substrate, wherein the thin film is formed by depositing sequential layers of $MO_x$ and ICP.

In another embodiment, a method of forming a cathode is disclosed that includes depositing a pre-formed $MO_x$/ICP hybrid that was formed by the chemical reaction of $MnO_4$ ion on an existing ICP polymer.

In another embodiment, a cathode is disclosed that includes an electrodeposited $MO_x$/ICP composite thin film upon a cathode substrate.

In another embodiment, a cathode is disclosed that includes an electrodeposited ICP thin film that is then chemically reacted in order to deposit $MO_x$ nanoparticles, thereby forming a hybrid $MO_x$/ICP structure.

In another embodiment, a device is disclosed that includes an electrodeposited $MO_x$/ICP composite thin film upon a cathode substrate. The device may be, but is not limited to a battery, a fuel cell, or an electrolyzer.

DETAILED DESCRIPTION OF THE INVENTION

The present disclosure is directed to composite films, electrodes including the composite films, electrocatalytic devices including the composite film electrodes, and methods of making the same. The composite films include metal oxide particles dispersed in an intrinsically conductive polymer (ICP). The metal oxide is an electrocatalytically active mater, such as but not limited to manganese oxides.

The present disclosure is further directed to methods that improve $MnO_x$ conductivity and ORR activity by hybridizing manganese oxide ($MnO_x$) nanoparticles with an intrinsically conductive polymer (ICP), such as, but not limited to poly(3,4-ethylenedioxythiophene) (PEDOT). According to an embodiment, hybrid PEDOT/$MnO_x$ nanoparticle films were prepared by organic electropolymerization of the 3,4-ethylenedioxythiophene (EDOT) monomer, followed by room temperature, aqueous growth of $MnO_x$ nanoparticles. This process is shown in FIG. 1.0. The PEDOT/$MnO_x$ film exhibits high activity toward the ORR in alkaline electrolyte, with an onset potential and half-wave potential. The PEDOT/$MnO_x$ film also shows predominantly a four-electron ORR mechanism and electrochemical selectivity in the presence of methanol.

The present disclosure is further directed to $MnO_x$/ICP composite thin films as a highly active catalyst for the oxygen reduction reaction in alkaline electrolyte. The composite films may be used as a coating upon a substrate to form a cathode to be used in electrocatalytic devices. The electrocatalytic device may be, but is not limited to fuel cells, batteries and electrolyzers.

The present disclosure is further directed to methods of forming electrocatalytic devices having a $MnO_x/ICP$ composite thin film deposited thereupon.

The present disclosure is further directed to ICP polymers that have been functionalized to include cationic, anionic functional groups or sites in order to aid ionic transport.

The present disclosure is further directed to ICP polymers that have been functionalized to include fluorinated moieties, such as fluorocarbon chains to effect wettability and gas transport properties.

In an embodiment, the electrocatalytic devices having $MnO_x/ICP$ composite thin films may be formed by electrodeposition of $MnO_x/ICP$ to form homogeneous films. In another embodiment, the electrocatalytic devices having $MnO_x/ICP$ composite thin films may be formed by sequentially depositing ICP and $MnO_2$ to form hybrid films of ICP and $MnO_2$ nanoparticles. In an embodiment, the sequential depositing is performed by organic electropolymerization of an ICP, followed by aqueous, room-temperature growth of $MnO_2$ nanoparticles by $MnO_4$ reduction.

In another embodiment, a method of forming a cathode is disclosed that includes depositing a $MO_x/ICP$ composite thin film upon an electrode substrate, wherein the thin film is formed by depositing sequential layers of $MO_x$ and ICP.

In another embodiment, a method of forming a cathode is disclosed that includes depositing a pre-formed $MO_x/ICP$ hybrid that was formed by the chemical reaction of $MnO_4^-$ ion with an existing ICP polymer.

According to an embodiment of the disclosure, $MnO_x/ICP$ composite thin films were electrodeposited by the aqueous micellar route in the presence of $Mn^{2+}$ (see FIG. 1A to form the electrocatalytic devices. Briefly, $MnO_x$ and PEDOT were co-electrodeposited from an aqueous solution of $Mn(OAc)_2$, EDOT, $LiClO_4$, and sodium dodecyl sulfate (SDS) at an anodic potential. $MnO_x$ only films and PEDOT only films were also electrodeposited, as controls, in the absence of EDOT or $Mn(OAc)_2$, respectively.

Figure 1B:
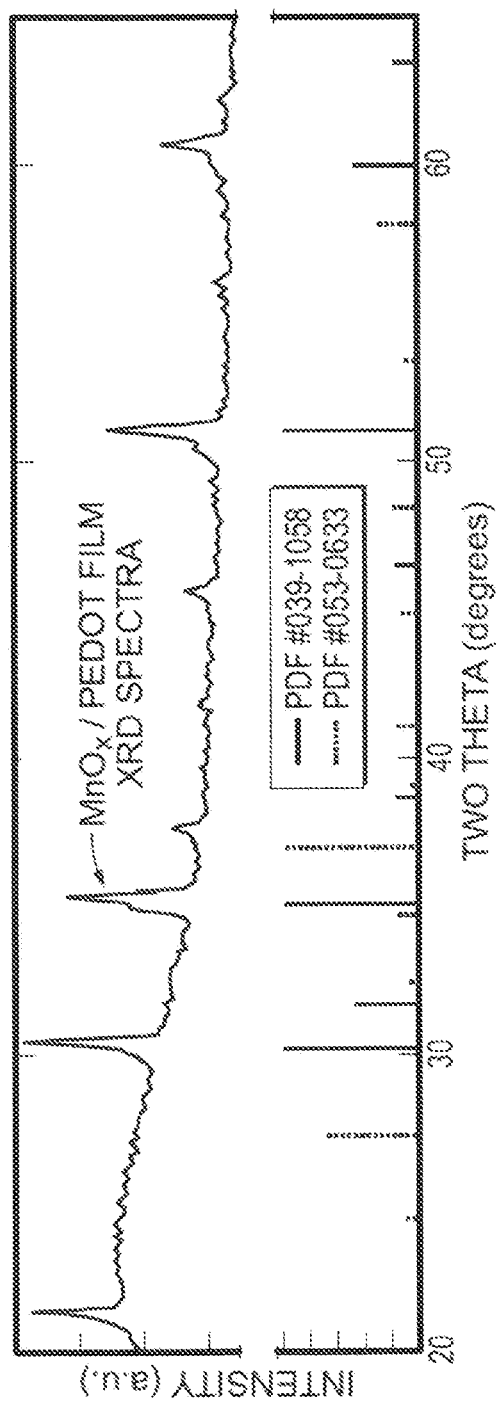
FIG. 1B shows an XRD spectra of the $MnO_x$/PEDOT film grown on ITO, with indices for $MnO_2$ (dotted, PDF #053-0633) and background ITO (solid, PDF #039-1058).
Figure 1C:
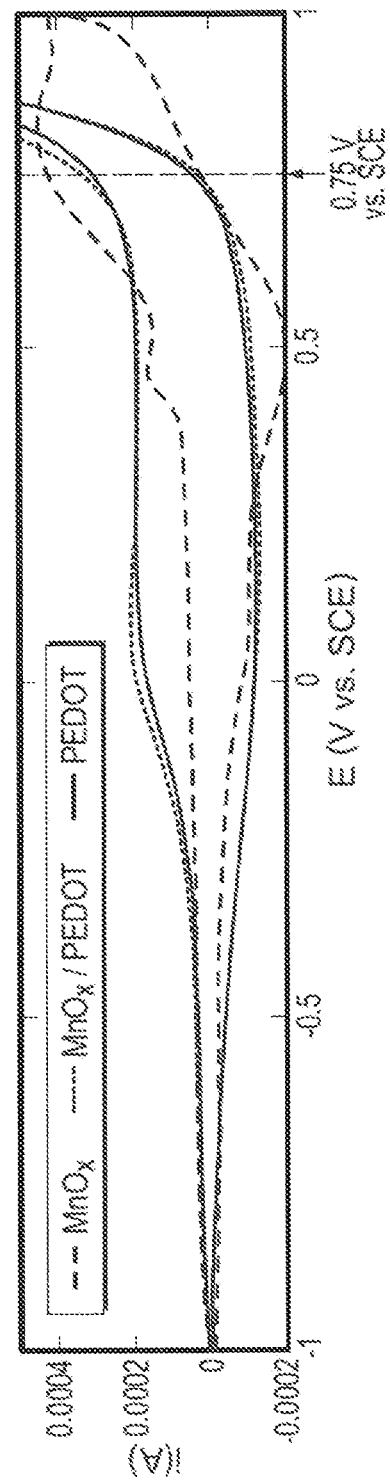
FIG. 1C shows CV scans in electrodeposition solutions for $MnO_x$ (dashed), PEDOT (solid), and $MnO_x$/PEDOT (short dashed), vertical dashed line represents the optimum deposition potential, 0.75 V vs. SCE.

FIG. 1B shows that the X-ray diffraction (XRD) spectra of a $MnO_x/PEDOT$ film deposited on indium tin oxide coated glass (ITO, PDF #039-1058) resembles $MnO_2$ (PDF #053-0633), but with weak intensity. Similarly electrodeposited films of $MnO_x$ have been characterized as $MnO_2$ and $MnO_x$ in the literature. Here we will refer to the films as hydrous $MnO_x$. Cyclic voltammetry (CV) was examined in the deposition solutions in order to monitor the redox processes of manganese and EDOT. FIG. 1C shows the CV curves, between −1.0 and 1.0 V vs. SCE at 100 mV s$^{-1}$, of the $MnO_x$, PEDOT, and $MnO_x/PEDOT$ deposition solutions. Two peaks in the anodic scan of $MnO_x$ deposition appear around 0.45 V and 0.8 V vs. SCE, attributing to a change in Mn valence from 2+ to a mix of 3+ and 4+. Generation of $MnO_2$ in potentiostatic electrodeposition is proposed to proceed through the generation of bulk $Mn^{3+}$, which decomposes in to a mix of $Mn^{2+}$ and $Mn^{4+}$, forming $MnO_2$ through hydrolysis.[30] Oxidation current of the PEDOT deposition solution begins around −0.25 V vs. SCE, corresponding to the oligomerization and polymerization processes at the electrode surface resulting in a thin film, while the rapid current growth beginning at 0.75 V vs. SCE is consistent with the oxidation potential of EDOT in aqueous solution. In the combined $MnO_x/PEDOT$ deposition solution, the anodic current of PEDOT coincides with the oxidation processes of manganese.

Figure 2A:
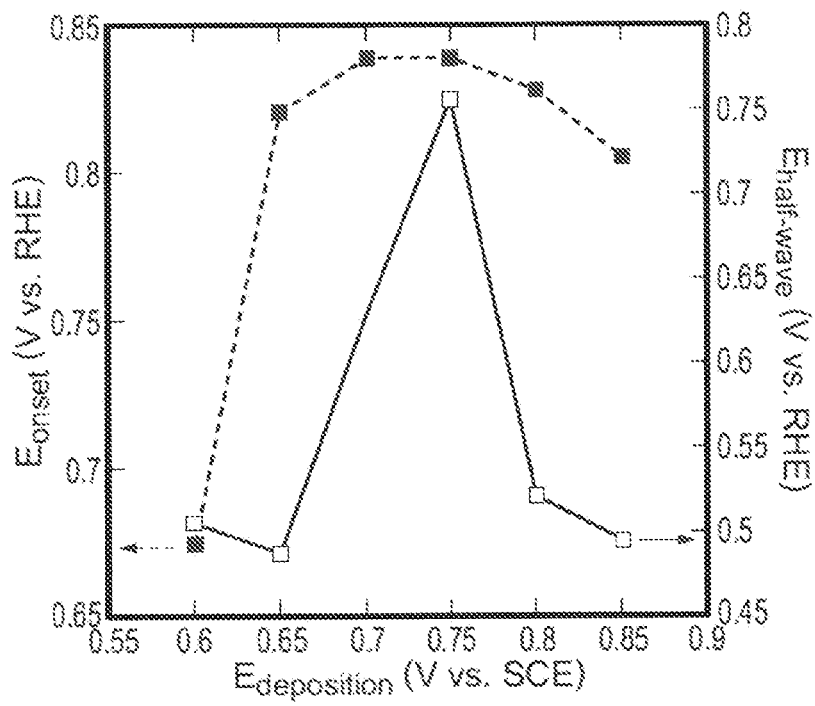
FIG. 2A shows a Volcano plot showing the trends in onset potential (solid squares) and half-wave potential (open squares) as the deposition potential is changed.
Figure 2B:
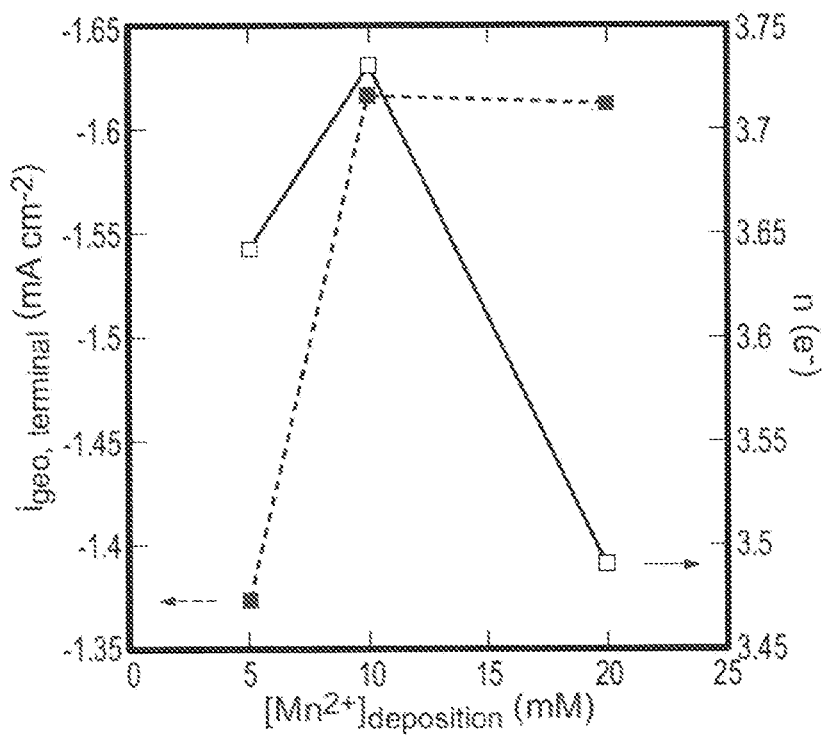
FIG. 2B shows a Volcano plot showing the trends in terminal current density (solid squares) and n value (open squares) as the $Mn^{2+}$ deposition concentration is changed.

Because the CV experiments were unclear in providing the optimum oxidation potential for co-deposition of $MnO_x$ and PEDOT, films were prepared at varying potentials (0.6 V-0.85 V, in 0.5 V increments) and their electrocatalytic performance compared utilizing rotating disk electrode (RDE) experiments. FIG. 2A shows the trends in ORR metrics of onset potential and half wave potential, as the deposition potential is changed. With the highest onset (0.84 V) and half-wave (0.75 V) potential values, 0.75 V vs. SCE was identified as the deposition potential resulting in the most active $MnO_x/PEDOT$ films and all future composite films were prepared at this potential. The possibility of effecting the $MnO_x$ film growth and performance by changing the concentration of $Mn^{2+}$ in the deposition solution was also investigated. FIG. 2B shows the trends in ORR metrics of terminal current density and reaction order (n value), as determined from the Koutecky-Levich equation, when the $Mn^{2+}$ concentration was halved (5 mM) and doubled (20 mM). With the highest terminal current density (−1.62 mA cm$^{-2}$) and n value (3.74), 10 mM $Mn^{2+}$ was identified as producing the most active film, and all future composite films were prepared at this concentration.

Figure 2C:
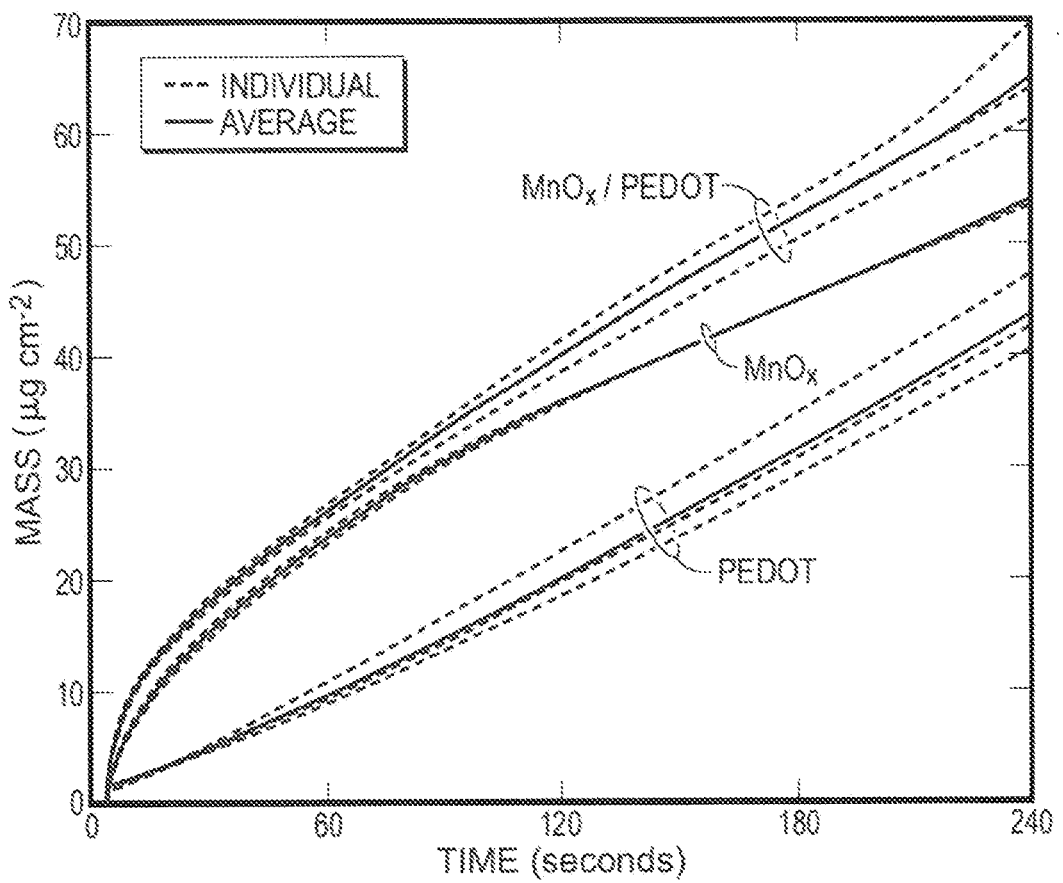
FIG. 2C shows a QCM plot showing the mass change vs. time of the $MnO_x$, PEDOT, and $MnO_x$/PEDOT depositions, individual (dotted lines) and average (solid lines) runs.

A quartz crystal microbalance (QCM) was utilized to monitor the changes in film mass during the electrodepositions. FIG. 2C shows the resulting mass change over time for the electrodeposition of $MnO_x$, PEDOT, and $MnO_x/PEDOT$ thin films. PEDOT exhibits a near-linear growth rate between 0 and 240 seconds, while $MnO_x$ and $MnO_x/PEDOT$ show an accelerated rate between 0 and 60 seconds followed by a near-linear region between 60 and 240 seconds. The resemblance of the $MnO_x/PEDOT$ growth to $MnO_x$ is consistent with the qualitative visual observation that the first 60 seconds of co-electrodeposition is almost completely $MnO_x$ film (gold color) growth, followed by PEDOT polymerization after this initiation period (blue color). QCM was also used to quantify film growth rates, and all of the catalyst films were prepared at an identical mass loading of 40 μg cm$^{-2}$.

Figure 2D:
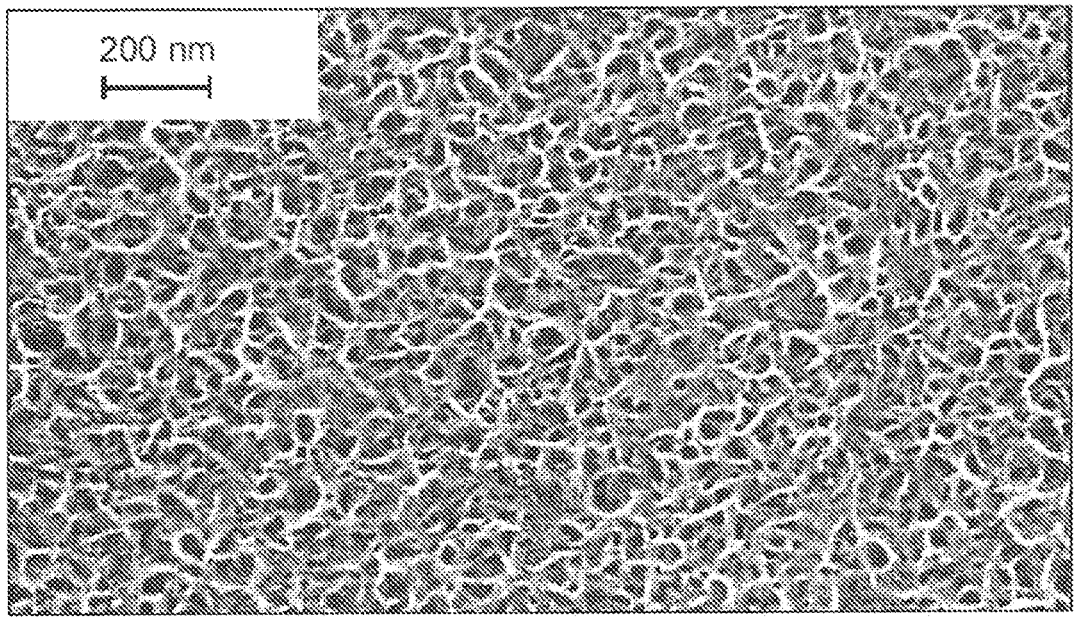
FIG. 2D shows an SEM image of a $MnO_x$/PEDOT film grown for 40 seconds.
Figure 2E:
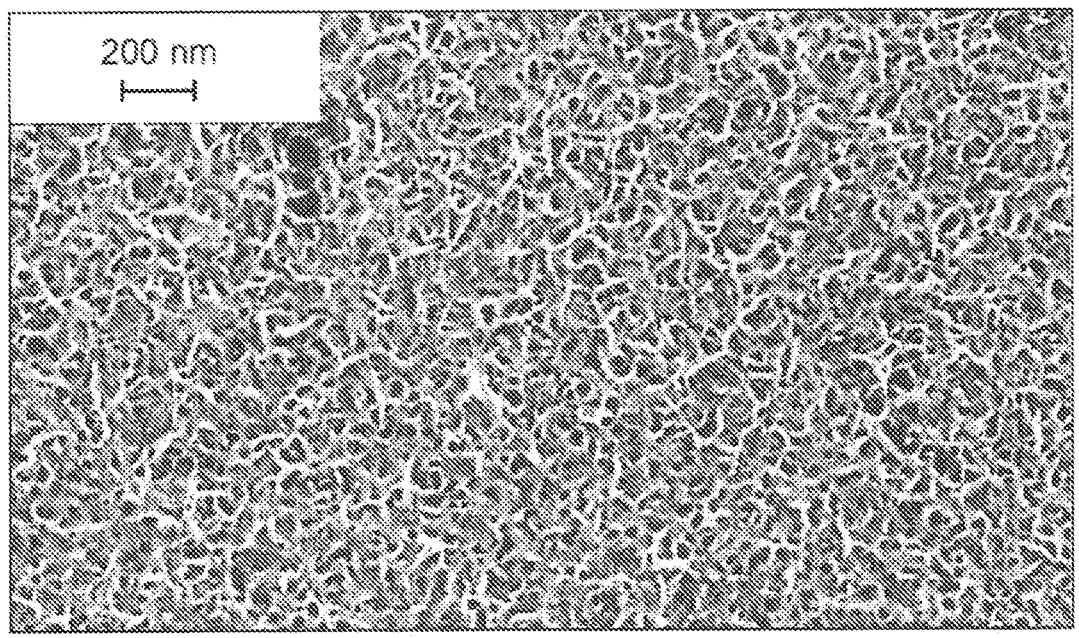
FIG. 2E shows an SEM image of a $MnO_x$/PEDOT film grown for 120 seconds.

Scanning electron microscopy (SEM) images were taken to examine the morphology of the films and provide further evidence of the co-electrodeposition growth process. FIGS. 2D and 2E show SEM images of $MnO_x/PEDOT$ films grown for 40 and 120 seconds, respectively. The images show the nanotextured morphology of the films, and that there is no appreciable difference in the overall morphology between 40 seconds and 120 seconds of deposition. Energy dispersive spectroscopy (EDS) elemental analysis shows the presence of S and Mn and that their intensity is growing at a linear rate with respect to time. The S present in the film is likely due to both polymer growth and SDS incorporation in to the structure, which is known to occur with the aqueous micellar electropolymerization of PEDOT. Furthermore, cross-sectional analysis indicates that the $MnO_x/PEDOT$ films have thicknesses of 58, 84, and 111 nm for deposition times of 40, 80, and 120 seconds, respectively. These values suggest that the films become slightly denser and less porous as the deposition time increases.

Figure 3A:
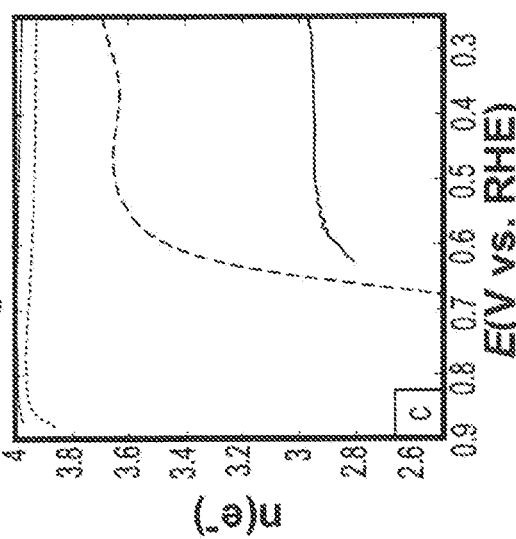
FIG. 3A shows disk current density LSVs for $MnO_x$ (dashed), PEDOT (thick solid), MnO-x/PEDOT (dotted) and 20% Pt/C (thin solid).

Catalyst films were then grown directly on the disk electrode of a rotating ring disk electrode (RRDE) in order to test their electrocatalytic activity toward the ORR. RRDE was used to simultaneously monitor the ORR current at the disk and oxidation current from generated peroxide (if any) at the ring, while scanning from low to high ORR overpotential in $O_2^-$ purged and blanketed 0.1 M KOH. It was expected that the $MnO_x$ films would indicate a quasi-four-electron reduction as the intrinsic ability of $MnO_x$ to catalytically decompose peroxide is known.[32-33] PEDOT, while conductive, is generally known to catalyze the ORR by the two-electron mechanism, although there is one example of a vapor phase-polymerized PEDOT operating via a 4$^-$ electron ORR process. Co-electrodeposited $MnO_x/PEDOT$, while used for capacitors, until now has not yet been investigated for electrocatalytic ORR. FIG. 3A shows the relevant catalytic ORR data for the electrodeposited films and commercial 20% Pt/C, all at the total mass loading of 40 µg cm$^{-2}$.

FIG. 3A shows the increase in ORR activity from the MnO$_x$ and PEDOT films to the MnO$_x$/PEDOT composite film. The synergistic effect of the co-electrodeposition can be seen in the improvement in onset potential (MnO$_x$: 0.682 V vs. RHE, PEDOT: 0.622 V, MnO$_x$/PEDOT: 0.877 V), half-wave potential (MnO$_x$: 0.593 V vs. RHE, PEDOT: 0.481 V, MnO$_x$/PEDOT: 0.825 V), and terminal current density (MnO$_x$: −0.892 mA cm$^{-2}$, PEDOT: −0.971 mA cm$^{-2}$, MnO$_x$/PEDOT: −1.617 mA cm$^{-2}$). Furthermore, the metric values of the MnO$_x$/PEDOT films are equal to or better than those of commercial benchmark catalyst 20% Pt/C, with an onset potential of 0.875 V vs. RHE, a half-wave potential of 0.791 V vs. RHE, and a terminal current density of −1.667 mA cm$^{-2}$. While the onset potential and terminal current values are similar, the MnO$_x$/PEDOT film (half-wave potential: 0.825 V vs. RHE) outperforms 20% Pt/C (half-wave potential: 0.791 V) in the half-wave regime. This distinction is of importance as the half-wave region is generally around the potential in which the maximum power could be extracted from a fuel cell.[34] Tafel slopes were also calculated to assess the kinetic effectiveness of each catalyst in the onset region. A low slope signifies a more effective catalyst; and the slopes trend with the overall ORR activity here, PEDOT (106 mV dec$^{-1}$)>MnO$_x$ (91 mV dec$^{-1}$)>20% Pt/C (87 mV dec$^{-1}$)>MnO$_x$/PEDOT (39 mV dec$^{-1}$). An ORR metric comparison with all other PEDOT and PEDOT composite catalysts studied by RDE can be seen in Table Si, Supporting Information. This data shows the superior performance of the MnO$_x$/PEDOT films prepared here when compared to other PEDOT-based ORR electrocatalysts.

Figure 3B:
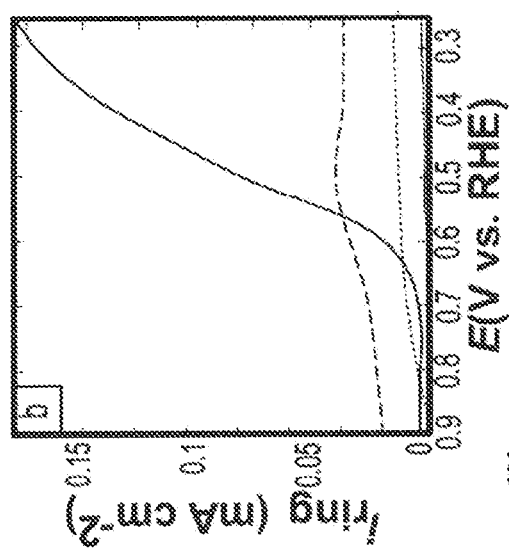
FIG. 3B shows ring current density LSVs for $MnO_x$, PEDOT, $MnO_x$/PEDOT and 20% Pt/C (same color legend as FIG. 3A).
Figure 3C:
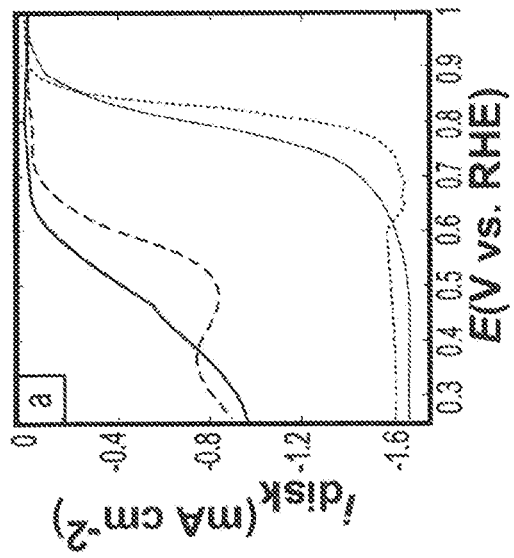
FIG. 3C shows n value LSVs for $MnO_x$, PEDOT, $MnO_x$/PEDOT and 20% Pt/C (same color legend as FIG. 3A).
Figure 3D:
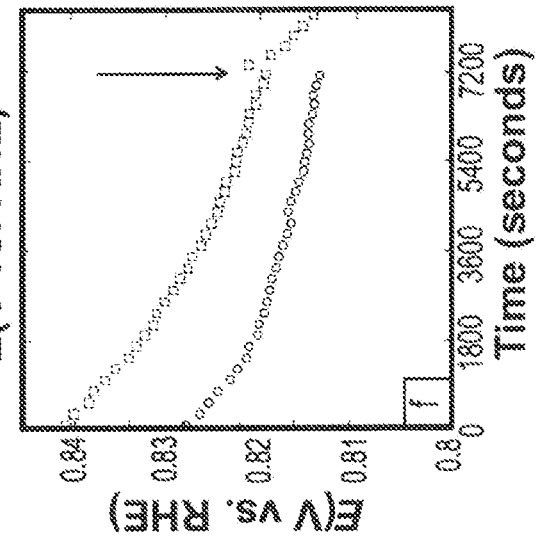
FIG. 3D shows peroxide percentage LSVs for $MnO_x$, PEDOT, $MnO_x$/PEDOT and 20% Pt/C (same color legend as FIG. 3A).

Ring current linear scanning voltammetry (LSV) scans in FIG. 3B represent the current from the oxidation of peroxide being generated by the catalysts performing ORR on the disk. The PEDOT and MnO$_x$ films exhibit significantly higher ring current during the ORR, especially when considered as a ratio of ring/disk current density (PEDOT j$_R$/j$_D$=0.177, MnO$_x$ j$_R$/j$_D$=0.045, MnO$_x$/PEDOT j$_R$/j$_D$=0.012, 20% Pt/C jRj$_D$=0.003). The quantification of ring and disk current by RRDE allows an accurate calculation of the n value and percent of peroxide generated for each catalyst, based on the collection efficiency of the instrument (see Supporting Information). n values, n=4(I$_D$)/(I$_D$+I$_R$/N) where I$_D$ is the disk current, I$_R$ is the ring current, and N is the collection efficiency, are shown in FIG. 3C. 20% Pt/C, as expected, showed an n value of ~4 from low (onset, n=3.98) to high overpotential (steady-state, n=3.98) as it generally proceeds by an efficient four-electron ORR mechanism. MnO$_x$/PEDOT exhibited a quasi-four-electron ORR mechanism, perhaps two rapid two electron transfers, with an essentially constant n value from low (onset, n=3.86) to high overpotential (steady-state, n=3.92). These values demonstrate the remarkable synergism between MnO$_x$ and PEDOT as the maximum attained n values for these catalysts individually were 3.68 and 2.96, respectively. Hence, the peroxide generation (FIG. 3D), % (H$_2$O$_2$)=200(I$_R$/N)/(I$_R$/N+ I$_D$), of the MnO$_x$/PEDOT film was significantly lower (<5%) at all overpotentials than the MnO$_x$ (>15%) and PEDOT (>50%) films. 20% Pt/C generated<1% peroxide, further verifying its efficient reduction of oxygen.

Figure 3E:
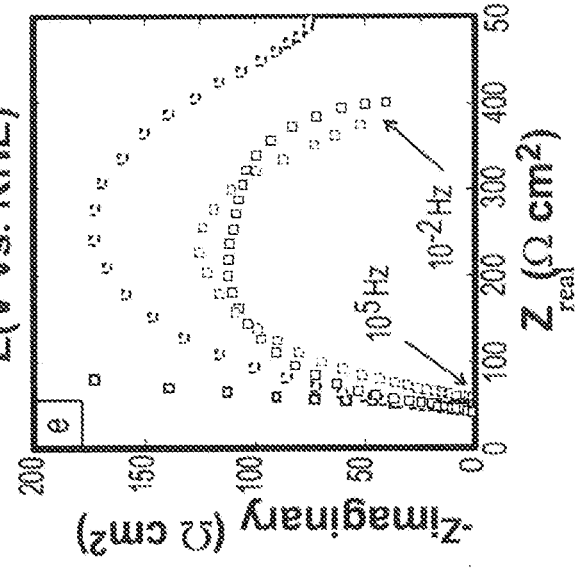
FIG. 3E shows EIS spectra for $MnO_x$ (three point circles), PEDOT (dark squares), $MnO_x$/PEDOT (five point circles) and 20% Pt/C (light squares).
Figure 3F:
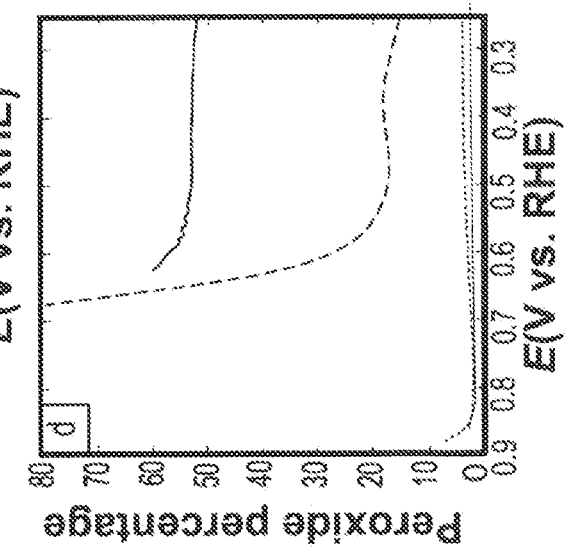
FIG. 3F shows stability and methanol experiments on $MnO_x$/PEDOT (broken squares) and 20% Pt/C (open circles), the arrow represents the addition of methanol in to the cell at two hours.

Considering the similarity of the MnO$_x$/PEDOT film and 20% Pt/C in ORR activity, further testing was done to assess their charge transfer and stability characteristics. Electrochemical Impedance Spectroscopy (EIS) experiments were carried out at constant half-wave current in O$_2$-purged and blanketed 0.1 M KOH, FIG. 3E. Modeling to the equivalent Randles circuit yielded charge transfer resistance (R$_{CT}$) values of 361Ω (MnO$_x$/PEDOT), 394Ω (20% Pt/C), 478Ω (MnO$_x$), and 3117Ω (PEDOT). R$_{CT}$ values calculated in the onset region of the ORR LSV yielded the same trend: 806Ω (MnO$_x$/PEDOT), 1181Ω (20% Pt/C), 2215Ω (MnO$_x$), and 2997Ω (PEDOT). Co-electrodeposition of MnO$_x$ and PEDOT clearly helps facilitate electron transfer during the ORR, perhaps even more efficiently than the 20% Pt/C benchmark catalyst. The intimate electrode contact realized by electrodeposition could explain the low resistances, another fundamental and practical advantage over a commercial powder electrocatalyst. Galvanostatic stability experiments were also carried out at constant half-wave current in O$_2^-$ purged and blanketed 0.1 M KOH for 8400 seconds, FIG. 3F. The MnO$_x$/PEDOT and 20% Pt/C catalysts were extremely stable over a two hour period, both retaining >97% of their activity. After two hours, methanol (5 wt. %) was introduced in order to test the catalysts' electrocatalytic selectivity for ORR in the presence of methanol (arrow—FIG. 3F). The MnO$_x$/PEDOT film displayed higher tolerance for methanol than 20% Pt/C suggesting its compatibility with methanol fuel cells. Combined with the fact that PEDOT has been used in fuel cells to limit methanol crossover and as a catalyst support, the development of MnO$_x$/PEDOT could find real application as an electrocatalyst in fuel cells.

In summary, MnO$_x$/ICP composite thin films were anodically electrodeposited by an aqueous micellar route and used as electrocatalysts for the ORR. The composite MnO$_x$/ICP thin film showed significant improvements over the MnO$_x$ and ICP control films for the ORR: 0.2-0.25 V more positive onset potential, 0.23-0.34 V more positive half-wave potential, 0.6-0.7 mA cm$^{-2}$ increase in terminal current density, and 100-2700Ω decrease in R$_{CT}$, as studied here. The activity of the MnO$_x$/PEDOT proved competitive with the commercial benchmark catalyst 20% Pt/C in terms of onset potential (MnO$_x$/PEDOT: 0.877 V vs. RHE, 20% Pt/C: 0.875 V), half-wave potential (MnO$_x$/PEDOT: 0.825 V vs. RHE, 20% Pt/C: 0.791 V), R$_{CT}$ (MnO$_x$/PEDOT: 361 Ω, 20% Pt/C: 394Ω), and exhibited superior electrocatalytic selectivity for ORR when exposed to methanol. The synergism and high activity of the MnO$_x$/PEDOT film is attributed to the facilitated electron transport, realized by co-electrodepositing MnO$_x$ and PEDOT.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. An oxygen reduction reaction device, comprising:
a composite film, comprising:
 a homogeneously dispersed composite film consisting essentially of a plurality of manganese oxide par- ticles dispersed in an intrinsically conductive polymer that is a component of a cathode of an electrocatalytic device;

wherein the intrinsically conductive polymer is selected from a group consisting of PEDOT and ProDOT;

wherein the homogeneously dispersed composite film is formed by electrodeposition of the manganese oxide particles with the PEDOT or ProDOT to homogeneously disperse the manganese oxide particles in the intrinsically conductive polymer to form a composite film consisting of $MnO_2$ and PEDOT or ProDOT; and wherein the composite film performs an oxygen reduction reaction.

2. The device of claim 1, further comprising a substrate.

3. The device of claim 1, wherein the device is an electrode.

4. The device of claim 3, wherein the electrode is a cathode.

5. The device of claim 1, wherein the composite film is a cathode that is part of a system selected from the group consisting of batteries, fuel cells, electrolyzers, hydrogen evolution reaction devices.

6. The device of claim 1, wherein the manganese oxide particles are nanoparticles.

7. The device of claim 1, wherein the manganese oxide particles are $MnO_2$ particles.

\* \* \* \* \*